United States Patent
Chiu et al.

(10) Patent No.: US 6,909,790 B2
(45) Date of Patent: Jun. 21, 2005

(54) SYSTEM AND METHOD OF MONITORING MOVING OBJECTS

(75) Inventors: Chaucer Chiu, Taipei (TW); Xu Dong Wang, Shanghai (CN)

(73) Assignee: Inventec Corporation, Taipei (TW)

(*) Notice: Subject to any disclaimer, the term of this patent is extended or adjusted under 35 U.S.C. 154(b) by 675 days.

(21) Appl. No.: 10/075,767

(22) Filed: Feb. 15, 2002

(65) Prior Publication Data

US 2003/0156736 A1 Aug. 21, 2003

(51) Int. Cl.$^7$ .................................................. G06K 9/00
(52) U.S. Cl. ....................... 382/103; 382/107; 348/169
(58) Field of Search ............................... 382/103, 107, 382/170, 284, 189, 209, 219, 305; 342/28, 64, 66, 79; 348/169, 155, 47, 48, 52, 152–154, 170–173; 375/240.01; 340/541

(56) References Cited

U.S. PATENT DOCUMENTS

| | | | | |
|---|---|---|---|---|
| 5,850,352 A | * | 12/1998 | Moezzi et al. ............... 345/419 |
| 6,326,994 B1 | * | 12/2001 | Yoshimatsu .................. 348/46 |
| 6,640,145 B2 | * | 10/2003 | Hoffberg et al. .............. 700/83 |
| 6,812,835 B2 | * | 11/2004 | Ito et al. ...................... 340/541 |
| 6,850,252 B1 | * | 2/2005 | Hoffberg ..................... 715/716 |
| 2002/0041698 A1 | * | 4/2002 | Ito et al. ...................... 382/103 |
| 2002/0051058 A1 | * | 5/2002 | Ito et al. ...................... 348/152 |
| 2002/0196330 A1 | * | 12/2002 | Park et al. .................... 348/49 |
| 2003/0067537 A1 | * | 4/2003 | Myers .......................... 348/47 |
| 2003/0107649 A1 | * | 6/2003 | Flickner et al. ............. 348/150 |
| 2003/0123703 A1 | * | 7/2003 | Pavlidis et al. ............. 382/103 |
| 2003/0133503 A1 | * | 7/2003 | Paniconi et al. ....... 375/240.16 |
| 2003/0156215 A1 | * | 8/2003 | Chiu et al. .................. 348/345 |
| 2003/0231787 A1 | * | 12/2003 | Sumi .......................... 382/103 |

* cited by examiner

*Primary Examiner*—Bhavesh M. Mehta
*Assistant Examiner*—Barry Choobin
(74) *Attorney, Agent, or Firm*—Jacobson Holman PLLC

(57) ABSTRACT

A system and method of monitoring moving objects. Once an object appears, the system of the invention automatically decides whether the object requires monitoring. If the answer is affirmative, the system starts to monitor the object continuously. The method involves using a large number of monitors, and it differentiates between a monitor's angle of monitoring and the monitor's overlapping angle of monitoring. If an object lies within the range of the monitor's angle of monitoring, the object is monitored with a single monitor. However, once the object is in the overlapping angle of monitoring, the object is monitored by two monitors simultaneously.

11 Claims, 3 Drawing Sheets

SYSTEM AND METHOD OF MONITORING MOVING OBJECTS

FIELD OF THE INVENTION

The invention is a method of tracing moving objects, and more particularly, a focusing method for moving objects that employs pattern matching to trace the moving objects.

BACKGROUND OF THE INVENTION

Given the development of the technology of multimedia communication and the increasingly powerful functions of computers, image processing of dynamic objects has gradually become a popular topic for research. The images of dynamic objects are usually displayed as full-motion video by displaying serial images. Accordingly, serial image processing has gradually become an important technique to image processing.

Since serial images involve a series of images, identifying the target objects shown in the images is the main task of image processing. In practice, the targets of serial images are divided, identified and traced. The technique applies to many fields, such as automatic monitoring, sports broadcasting, video frequency compression, monitoring production lines and intelligent traffic control.

In addition, target tracing in image processing has become a key technique in the latest technology of MPEG-4, wherein MPEG-4z provides content-based image operation by means of the technique of target tracing and division. Therefore, thorough exploration of this technology will have a far-reaching effect upon the development of its various applications.

For the time being, there are many computation methods for target identification and tracing, wherein the most widely used is the computation method of pattern matching and updating that is based on the features of images. This computation method compares the image features currently extracted with the features of the pattern of the target being traced. The features adopted are usually the marginal features of the images. The last step of the computation method is matching the target pattern and the current images, as well as updating the pattern simultaneously. A recently developed means of pattern matching based on Hausdorff distance is quite effective. However, its disadvantage is that, in the course of matching, the space of searching increases rapidly with the size of the image and the size of the pattern, causing a larger and larger workload for the memory and the processor required to conduct the searching. Furthermore, extraction of image features is not an easy job, as the efficiency of searching and tracing decreases with the size of the image and the size of the pattern, making goals achievement extremely difficult.

Therefore, the most important issues of research are precision, automation and efficiency in target tracing.

OBJECT AND SUMMARY OF THE INVENTION

In view of the aforesaid problems of the known technology, the object of the invention is to provide a method and a system of monitoring moving objects. With the technique of image identification, the images of a moving object are extracted. The moving object is monitored continuously by a monitoring system that works online.

According to the technology disclosed by the invention, the invention provides a moving object monitoring system that monitors a certain region with a large number of monitors. Each monitor works within a range of angles of monitoring and a range of overlapping angles of monitoring. The range of overlapping angles of monitoring defines the doubly viewed region made possible with a pair of monitors. With more than one monitor, the system monitors a moving object automatically. The system has a memory module that records a plurality of serial images of the moving object taken by the monitor. The memory module also records a plurality of target patterns to be monitored so as to conduct comparison during automatic monitoring. The system also has a target identification module for analyzing the plurality of serial images and generating a plurality of target patterns. Whenever the plurality of target patterns matches one of the plurality of to-be-monitored target patterns, the system outputs a command of target monitoring. The system is also equipped with a speed calculation unit that calculates the speed at which the target object moves. The speed calculation unit converts the speed into an angular speed at which the monitor has to rotate while monitoring the target object. Having figured out the angular speed, the monitor sends out an angle adjustment signal. The system also has a switch unit for switching the monitoring status between a single-monitor monitoring status and a dual-monitor monitoring status. The system is also equipped with a control unit. The control unit retrieves the plurality of serial images stored in the memory module and sends them to the speed calculation unit for calculating the angular speed, after receiving the command of target monitoring. The control unit also receives the angle adjustment signal and sends it to the monitor that is monitoring the target. The control unit controls the switch unit so as to change the monitoring status. Finally, the system also has a connection unit for being linked up to the memory unit, the target identification module, the speed calculation unit, the angle adjustment unit, the switch unit and the control unit.

The method of the invention for monitoring moving objects involves the following steps. Set a plurality of to-be-monitored target patterns. Retrieve the serial images of the moving object from the monitor that is monitoring the moving object whenever the moving object appears. Generate an identification pattern according to the serial images of the moving object. Compare the identification pattern with the plurality of to-be-monitored target patterns and, according to the degree of similarity, determine that the moving object is an object to be monitored. Generate a target pattern and a new target pattern with respect to the to-be-monitored object. Figure out the speed at which the to-be-monitored moving object moves according to the target pattern and the new target pattern. Adjust the angle from which the monitor monitors the moving object, according to the speed of the moving object. Switch the monitoring status of the monitors that are monitoring the moving object to dual-monitor monitoring status whenever the monitors start to work in the range of overlapping angles of monitoring instead of the range of the angles of monitoring. Switch the monitoring status of the monitors that are monitoring the moving object to single-monitor monitoring status whenever the range of the angle of monitoring of one of the two monitors lies outside its range of the overlapping angles of monitoring, while the range of monitoring angles of the other monitor changes to its range of the angles of monitoring from its range of overlapping angles of monitoring.

As regards the features and the practical operation of the invention, illustration and detailed explanations of a preferred embodiment are given below:

DETAILED DESCRIPTION OF THE PREFERRED EMBODIMENT

Figure 1:
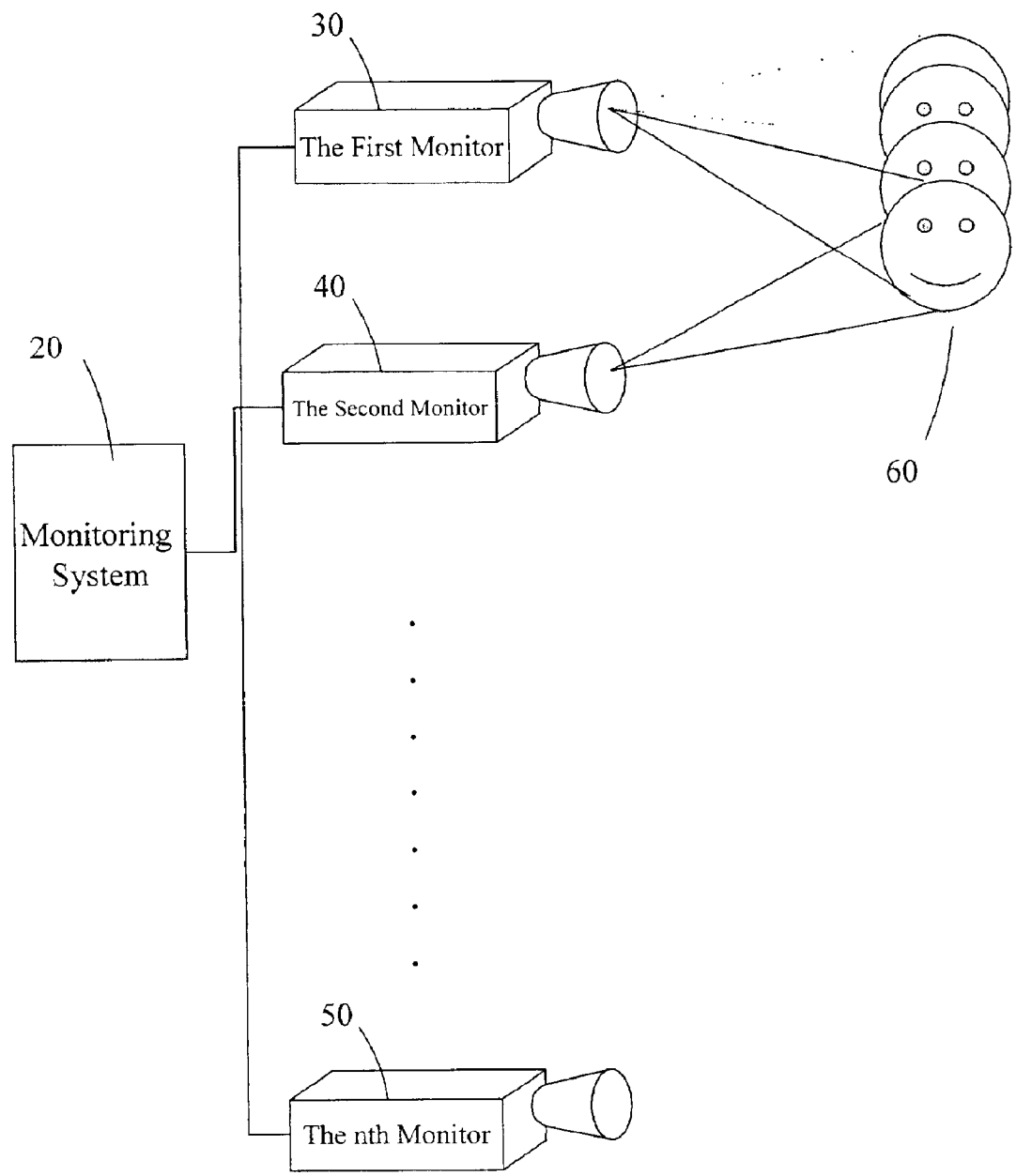
FIG. 1 depicts the system for monitoring moving objects as disclosed by the invention.

Please refer to FIG. 1, which shows a system of monitoring moving objects. With the monitoring system 20 of the invention, a large number of monitors, namely the first monitor 30, the second monitor 40 and the nth monitor 50, are manipulated for monitoring moving objects 60. Each monitor connects directly to the monitoring system 20, not only to send image signals to the monitoring system 20, but also to receive the control commands sent by the monitoring system 20.

Each monitor can rotate, or, in other words, it can switch the monitoring foci. Therefore, each monitor has to monitor a certain region. In general, to achieve omni-bearing monitoring, a large number of monitors are required to work in crossed directions so as to prevent a dead space.

As shown in FIG. 1, when a moving object 60 moves from the first monitor 30 toward the second monitor 40, the monitoring system 20 judges the movement of the object in accordance with the images taken by the first monitor 30, and determines the angle of rotation of the first monitor 30 in accordance with the speed at which the moving object 60 moves. Once the moving object 60 reaches the limit of the range of the first monitor's 30 angle of monitoring, the moving object 60 lies in the range of the second monitor's 40 angle of monitoring. The point is the overlapping monitoring regions of the first monitor 30 and the second monitor 40. The monitoring system 20 makes the first monitor 30 and the second monitor 40 jointly in charge of monitoring the moving object 60 and, at the same time, adjusts the monitoring angles of the second monitor 40. As a result, once the moving object 60 goes beyond the monitoring region of the first monitor 30, it is still monitored continuously by the second monitor 40, which receives the monitoring commands of the monitoring system 20. Its control method is similar to that of the first monitor 30.

As regards the installation of a monitor, the monitoring angles of a monitor are defined and divided into two types: a range of the angle of monitoring and a range of the overlapping angle of monitoring. The two ranges of angles combine to form the range of angles of the view of the monitor. The range of overlapping the angle of monitoring represents the region to-be-monitored by the aforesaid two monitors, while the range of the angle of monitoring represents the region that lies within the range of angles of view, but falls outside the range of the overlapping angle of monitoring. Once an object goes into a to-be-monitored region, it falls within a region jointly monitored by two of a large number of monitors.

With such a monitoring method, a moving object that lies within the region to be monitored can be continuously monitored by the monitoring system. Thus, the method solves the problem of dead space.

Figure 2:
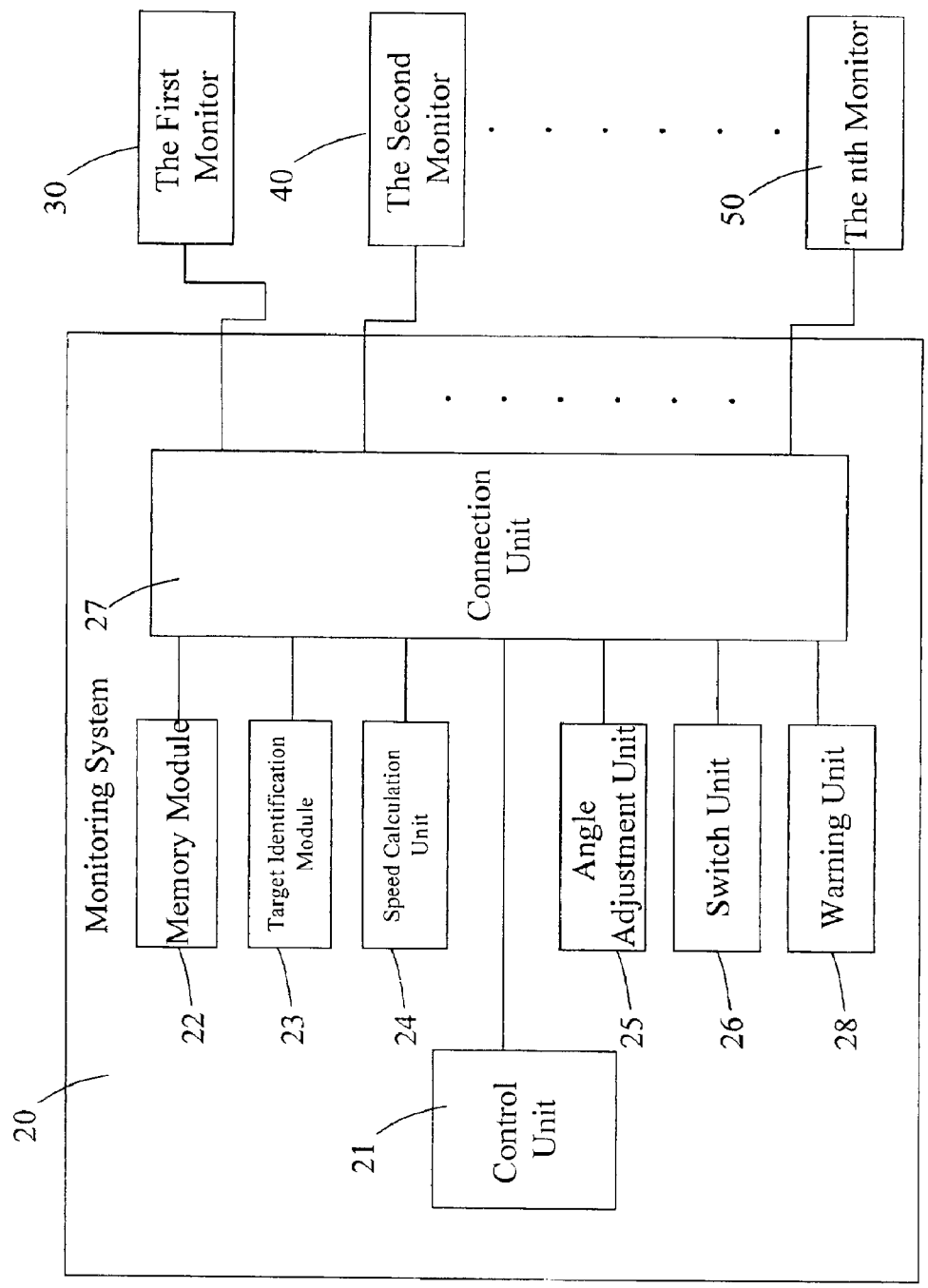
FIG. 2 shows a functional block diagram of the moving object monitoring system.

Please refer to FIG. 2 for a concrete functional block diagram of the monitoring system depicted in FIG. 1. The monitoring system comprises the control unit 21, the memory module 22, the target identification module 23, the speed calculation unit 24, the angle adjustment unit 25, the switch unit 26, the connection unit 27 and the warning unit 28.

In the beginning, a variation in the images monitored by whichever monitor is likely due to the appearance of an object. At that point, the monitoring system 20 begins to make judgment and monitor automatically, according to the data sent by the monitors. In the subsequent paragraph, the purpose and function of every component of the monitoring system 20 will be explained.

Firstly, the memory module 22 records basic target patterns to be monitored. The memory module 22 also records new target patterns to be monitored. The target identification module 23 receives image data sent by individual monitors and compares the image data with the target patterns, so as to identify target images and form new target patterns. The target identification module generates and compares patterns ceaselessly. Once an image taken by a monitor matches a to-be-monitored target pattern of the memory module 22, the target identification module 23 sends a monitoring command to the control unit 21 and the system begins to monitor, while the control unit 21 sends a warning signal to the warning unit 28, warning the operation personnel that the system has already begun to monitor.

The speed calculation unit 24 figures out the angular speed of a moving object, according to the serial images sent by the monitors as well as the displacement of the images. The angle adjustment unit 25 adjusts the angles from which a monitor works, pursuant to the angular speed of the moving object figured out by the speed calculation unit 24, so that the monitor always focuses on the moving object. The switch unit 26 is used to switch monitors, for example, one monitor, two monitors, or switches to the next monitor for monitoring a moving object continuously. The connection unit 27 is used to connect individual units and individual external monitors.

The control unit 21 is in charge of transmission of control signals and procedures. Whenever the target identification module 23 decides that a target object has appeared, it will send a target appearance signal to the control unit 21. The control unit 21 is then in control of the continuous storage of target image data by the memory module 22. Then, the control unit 21 sends the target serial images recorded in the memory module 22 to the speed calculation unit 24 in order to figure out the speed at which the object moves, and convert the speed into angular speed. The speed calculation unit 24 then sends the angular speed it figures out to the angle adjustment unit 25, which figures out the angles from which monitors work, according to the data of the angular states of individual monitors. Eventually, the control unit 21 adjusts the angles from which monitors work, so as to facilitate continuous monitoring. The aforesaid signal transmission is achieved via the connection unit 27.

In the event that the target object or moving object monitored by a monitor reaches the limit of the range of angles of rotation of the monitor, another monitor should be capable of viewing the target object. The control unit 21 is in control of the switch in the monitoring status of monitors conducted by the switch unit 26. The monitoring status can switch to either a single-monitor monitoring status or a dual-monitor monitoring status. Under a dual-monitor monitoring status, the moving object is viewed by two monitors simultaneously. If the images of the target object appear in only one monitor, the monitoring status has to be the single-monitor monitoring status and the control unit 21 controls only one monitor.

Figure 3:
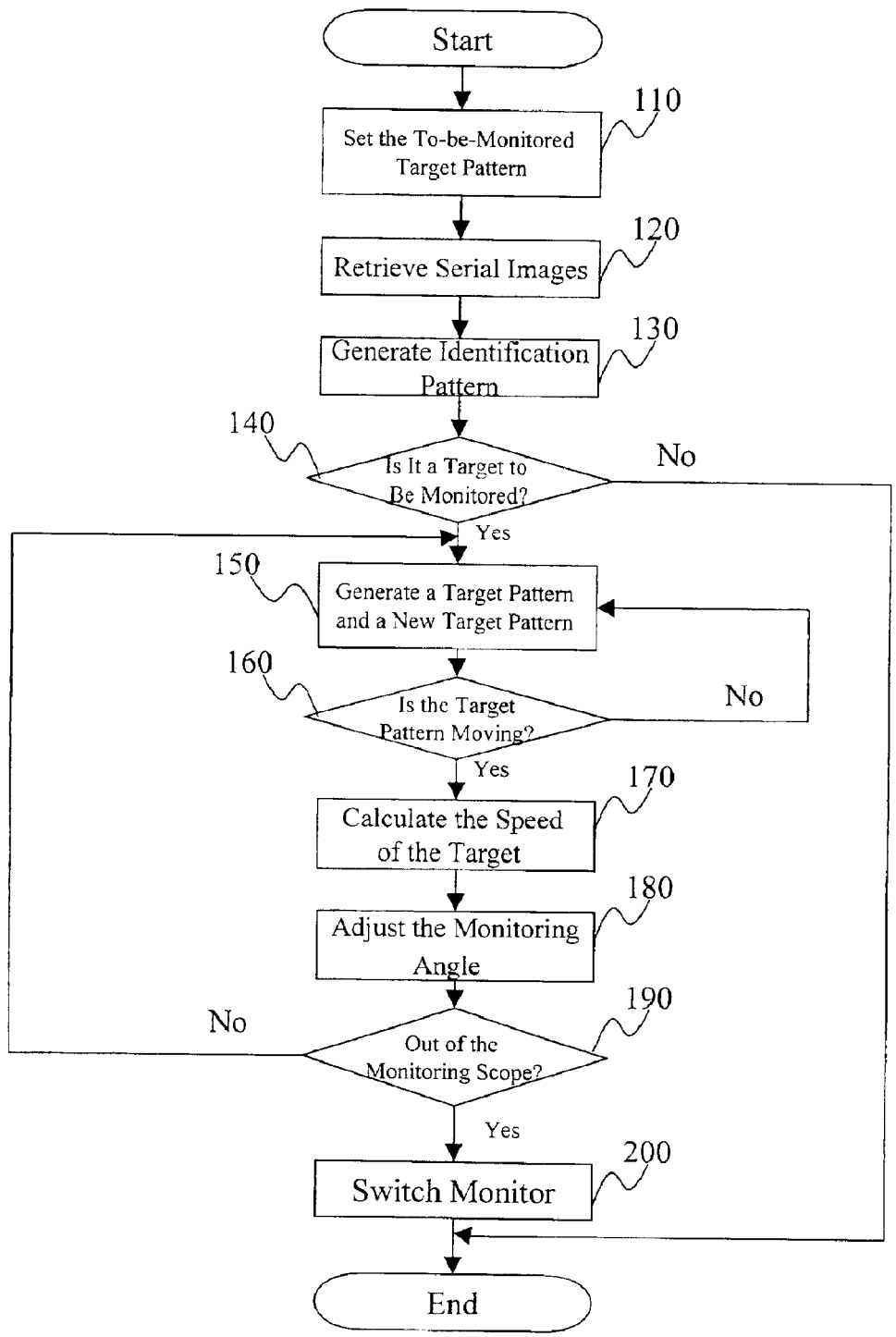
FIG. 3 shows a flowchart of the method of monitoring moving objects as disclosed by the invention.

For a flowchart of monitoring moving objects, refer to FIG. 3. The method includes the following steps: set the to-be-monitored target pattern (step 110), retrieve serial images (step 120), generate an identification pattern (step 130), determine whether is it a target to be monitored (step 140), generate a target pattern and a new target pattern (step 150), determine whether the target pattern is moving (step 160), calculate the speed of the target (step 170), adjust the monitoring angle (step 180), determine whether it is out of the monitoring scope (step 190); and switch monitors (step 200).

This flowchart is about the monitoring conducted by a single monitor, though it also applies to the monitoring conducted by a pair of monitors. Monitors take images all the time, as they are designed to do. What really matters is when the monitors begin to take images. The invention works by starting with step 110, wherein the decision whether a target object is to be monitored or not is based on the to-be-monitored target patterns, such as persons, vehicles, etc., stored beforehand in the memory module 22, as shown in FIG. 2. Once an image taken by a monitor varies, the system begins to take images (step 120). The images taken are stored in the form of serial images. Identification patterns are generated the moment the images are taken (step 130). Once the identification patterns meet the setting criteria of the to-be-monitored target pattern (step 140), the system automatically monitors and adjusts the angles from which individual monitors work. The matching criteria (degree of similarity) can be the shapes of the patterns. As long as there is a certain degree of similarity, that is, 70%–100%, it can be decided that the target object is to be monitored. Otherwise, no monitoring will take place.

Once it is decided that a target object is to be monitored, monitoring begins. Target patterns and new target patterns can be generated by retrieving serial images endlessly (step 150). Since it is likely that the target patterns and the new target patterns vary according to the movement of the target object, it is possible to figure out whether the target object moves or not by making reference to the discrepancy in the positions of the target pattern and the new target pattern in the images. This is the criterion against which in step 160 an evaluation is made as to whether a target object moves or not.

Once it is decided that a target object is moving, the next step occurs—calculate the speed of the target object (step 170), and figure out the angular speed of the target relative to a monitor. If the target object is judged to be static, then the task of comparison between a target pattern and a new target pattern continues, or, in other words, goes back to step 150. In the next step, an adjustment is made in the monitoring angles according to the said angular speed (step 180), so that the monitor faces the target object continuously. Since every monitor works within the limits of a range of monitoring angles, it is possible to identify a certain monitoring region by means of the monitoring angles of a monitor. Once the target object goes beyond a monitoring region (step 190), a monitor switch is immediately made (step 200). However, the aforesaid monitoring region functions within certain safety limits. In other words, the monitoring region is set for two monitors can monitor the same target in the region defined by the overlapping angle. That is, another monitor is monitoring the target object the moment a monitor switch is made. Therefore, step 200 represents dual-monitor monitoring status.

Although the judgment criterion of whether a target object goes beyond a monitoring region is mentioned above, it is worth stressing that a target object goes beyond a monitoring region whenever it moves from a region of the angle of monitoring toward a region of the overlapping angle of monitoring, or, in other words, whenever the direction of the monitor switches from a to-be-monitored angle of the target object to a overlapping angle of monitoring of the target object. At such a point, it is necessary to use another monitor to monitor the region in which the target object emerges, or, in other words, it is necessary to monitor the target object with two monitors simultaneously.

In step 140, if it is decided that the target object is to be monitored, then a step for sending out a warning signal can be added, to give a warning to the personnel who operate the system.

While the invention has been described by way of example and in terms of a preferred embodiment, it is to be understood that the invention is not limited thereto. It should be understood that the detailed description and specific examples, while indicating preferred embodiments of the invention, are given by way of illustration only, since various changes and modifications within the spirit and scope of the invention will become apparent to those skilled in the art from this detailed description. Therefore the scope of protection for the invention should conform to the claims attached below.

What is claimed is:

1. A moving object monitoring system utilizing a plurality of monitors to monitor a region, wherein each monitor works within a range of angle of monitoring and a range of overlapping angle of monitoring defined the doubly viewed region made possible with a pair of monitors, which automatically monitors a moving object by controlling said plurality of monitors, comprises:

a memory module for recording a plurality of serial images of said moving object taken by said monitor and recording a plurality of to be monitored target patterns for comparing during automatic monitoring;

a target identification module for analyzing said plurality of serial images and generating a plurality of target patterns, which outputs a command of target monitoring whenever said plurality of target patterns match one of said plurality of to-be-monitored target patterns;

a speed calculation unit for calculating the speed at which said target object moves and converting said speed into an angular speed at which said monitor has to rotate while monitoring the target object;

an angle adjustment unit which adjusts the monitoring angles of said monitor according to said angular speed to send out an angle adjustment signal;

a switch unit for switching a monitoring status selected from a single-monitor monitoring status and a two-monitor monitoring status;

a control unit, which retrieves said plurality of serial images stored in said memory module and sends them to said speed calculation unit for the calculation of said angular speed after receiving said command of target monitoring and receives said angle adjustment signal and sends to said monitor which is monitoring the target, and controls said switch unit to change the monitoring status; and a connection unit for connecting said memory unit, said target identification module, said speed calculation unit, said angle adjustment unit, said switch unit and said control unit.

2. The moving object monitoring system of claim 1, further comprises a warning unit connected to said connection unit for sending out a warning signal whenever said system begins to monitor said moving object.

3. The moving object monitoring system of claim 1, wherein the target identification unit compares said plurality of target patterns with the shapes of said to-be-monitored target patterns and sends out a monitoring command when there is a certain degree of similarity.

4. The moving object monitoring system of claim 3, wherein said degree of similarity is 70%–100%.

5. The moving object monitoring system of claim 1, wherein said switch unit switches the monitoring status to a single-monitor monitoring status whenever said monitoring region of said monitor lies within said region to be monitored.

6. The moving object monitoring system of claim 1, wherein said switch unit switches the monitoring status to a two-monitor monitoring status whenever said monitoring region of said monitor lies within said region to be doubly monitored.

7. The moving object monitoring system of claim 1, wherein the monitoring status is said two-monitor monitoring status, said control unit retrieves said images of said two monitors and sends to said speed calculation unit for calculating a speed of the moving object, then the speed of the moving object is sent to said angle adjustment unit for figuring out two sets of adjusted angles to make an adjustment in said two monitors.

8. A method for monitoring moving objects utilizing a plurality of monitors to monitor a region, wherein each monitor works within a range of angle of monitoring and a range of overlapping angle of monitoring defined the doubly viewed region made possible with a pair of monitors, which automatically monitors a moving object by controlling said plurality of monitors, the method comprises the following steps:

set a plurality of to-be-monitored target pattern;

retrieve serial images of said moving object from said monitors that monitor said moving object when said moving object emerges;

generate an identification pattern according to the serial images of said moving object;

compare said identification pattern with said plurality of to-be-monitored target patterns and determine whether said moving object is to be monitored according to a degree of similarity, generate a target pattern and a new target pattern for said object to be monitored;

calculate a speed of the movement of said object to be monitored according to said target pattern and said new target pattern;

make an adjustment in the monitoring angles of said monitor according to said speed;

switch to a two-monitor monitoring status when the monitoring angles of said monitor switches to said to-be-monitored doubly angle from said to-be-monitored angle; and switch to a single-monitor monitoring status when said range of the angle of monitoring of one of the two monitors lies outside said range of the overlapping angle of monitoring and the monitoring angle of another monitor switches to said to-be-monitored doubly angle from said to-be-monitored angle.

9. The method of monitoring moving objects of claim 8, wherein the degree of similarity is acquired by comparing the shapes of the patterns of said moving object with those of said plurality of to be monitored target patterns.

10. The method of monitoring moving objects of claim 8, wherein said degree of similarity is 70%–100%.

11. The method of monitoring moving objects of claim 8, further comprises a step for sending out a warning signal follows the step of determining said object to be monitored.

* * * * *